July 19, 1966

G. HIRS 3,261,453

HELICAL STORAGE UNIT

Filed Sept. 11, 1964

INVENTOR.
GENE HIRS
BY
WILSON, SETTLE & CRAIG
ATTORNEYS

United States Patent Office
3,261,453
Patented July 19, 1966

3,261,453
HELICAL STORAGE UNIT
Gene Hirs, 6865 Meadowlake Road, Birmingham, Mich.
Filed Sept. 11, 1964, Ser. No. 395,806
5 Claims. (Cl. 198—212)

This invention relates to helical storage units of the type wherein parts supported in a helical chute are moved upwardly or downwardly within the chute by a rotary brush engageable with parts in the chute, and more particularly to improvements in the brush mounting assembly for such units.

An example of a storage unit of the type with which the invention is concerned is disclosed in United States Patent No. 3,071,240. Units of this type are employed in production lines where parts are being fed from one machine to another. The storage unit may act as a reservoir of parts in which a large number of parts can be stored to compensate for variations in the output rate of the two machines. In the usual case, the storage unit also performs the function of a parts elevator, so that parts may be gravitationally fed from the first machine to the storage unit, elevated in the storage unit and gravitationally fed from the storage unit to the second machine.

The storage unit consists basically of a helical chute or track along which the parts are urged by rotating brushes whose bristles engage the parts in the track to urge the parts along the track. Brushes are employed so that in the event the storage unit becomes full, the bristles merely brush across the stationary parts.

The storage units may be of fairly substantial height and, in the usual case, a number of individual brushes are mounted upon a vertically extending member which is rotated about the axis of the helical chute. The brushes must be capable of radial adjustment to initially dispose the brushes in engagement with the parts in the chute and further to compensate for wear of the bristles which occurs with use.

It is an object of the present invention to provide a brush assembly for helical storage units of the type referred to above wherein the brush units may be rapidly and accurately adjusted with respect to the parts carrying chute.

Other objects and features of the invention will become apparent by reference to the following specification and to the drawings.

Figure 1:
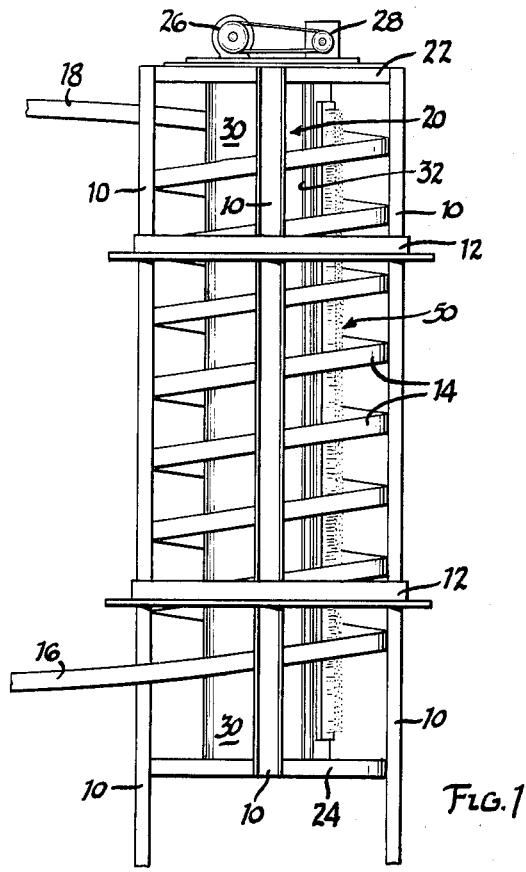
FIGURE 1 is a side elevation, partially schematic, and with certain parts omitted, of an exemplary helical storage unit embodying the invention.

In FIGURE 1, a storage unit embodying the invention is disclosed. A typical unit includes a stationary frame in the form of a cylindrical cage with upright frame members 10 and a suitable number of ring-like circumferential frame members 12. A helical chute 14 is supported in the fixed frame defined by members 10 and 12 and is connected at its lower end to an inlet chute 16 from which parts are fed into the storage unit, and an outlet chute 18 from which parts are conveyed away from the storage unit.

Chute 14 is indicated only schematically in FIGURE 1, since its cross sectional shape is determined by the parts which are to be conveyed along the chute. For purposes of the present application, the chute may be assumed to have a generally U-shaped cross section, as indicated in FIGURE 2.

Mounted at the interior of the helical chute is a rotary assembly designated generally 20 which is supported for rotation about the vertical axis of the helical chute, as between upper and lower frame plates 22 and 24. A suitable drive motor 26 and gear reduction coupling 28 may be employed to drive the assembly 20 in rotation about the vertical central axis of the helical chute. Assembly 20 consists of a suitably constructed brush support frame which will usually consist of a central frame, schematically illustrated as a cylinder 30, in FIGURE 1, upon which are mounted one or more vertical brush support members 32 which preferably take the form of a right angled section mounted upon the rotating frame 30 with one web 34 of the section extending radially from the rotating frame. Web 34 is formed with a plurality of aligned vertically spaced bores 36 (see FIGURES 2 and 4) through which project the shanks of clamping bolts 38.

Figure 3:
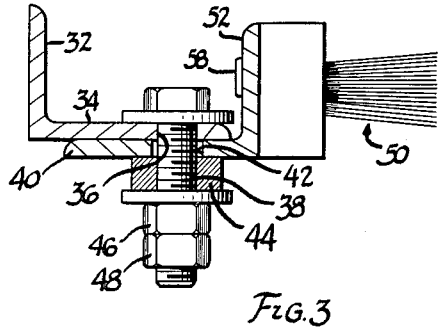
FIGURE 3 is a cross sectional view of the brush assembly taken on line 3—3 of FIGURE 2.

The brush assembly includes a second elongate angle section having a web 40 which is disposed in face-to-face engagement with web 34 of the brush support member. Web 40 is formed with a plurality of vertically spaced and aligned parallel slots 42, the vertical spacing of slots 42 corresponding to the vertical spacing of bores 36. Preferably, the opposite side walls of slot 42 are cut slightly oversized and a pair of metallic strips 44 are welded to the outer side of web 40. By forming the slots in this manner, the slots may be cut through web 40 without any great degree of precision, and the strips 44 subsequently welded in place by the employment of a jig to achieve accurate parallelism and vertical alignment of the various slots with each other. As indicated in FIGURE 3, clamping bolts 38 project from bores 36 through the slot defined by the opposed strips 44, and webs 34 and 40 are clamped to each other by a clamping nut 46 and lock nut 48, as shown in FIGURE 3.

Figure 4:
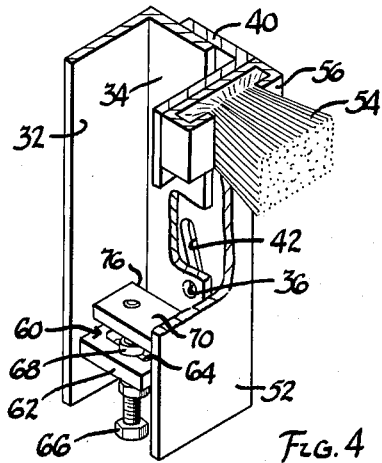
FIGURE 4 is a perspective view, partially in section, showing further details of the brush assembly.
Figure 2:
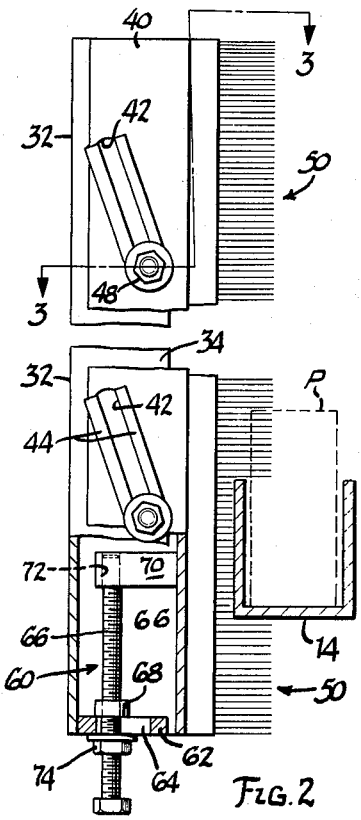
FIGURE 2 is a side elevational view with certain parts broken away or shown in section of a brush assembly embodying the invention.

An elongate brush 50 is fixedly secured to the other web 52 of the brush member, the brush including, as best seen in FIGURE 4, bristles 54 retained in an elongate channel member 56 of generally C-shaped cross section which is secured to web 52 by any suitable means such as rivets 58 (FIGURE 2). As best seen in FIGURE 1, the length of brush 50 exceeds the axial extent of chute 14.

Brush 50 is vertically positioned relative to brush support member 32 by an elevating screw assembly 60, details of which are best seen in FIGURES 2 and 4.

The elevating screw assembly includes a horizontal plate 62 which is welded to the lower end of brush support member 32 and formed with an elongate slot 64 which is oriented to extend radially from the axis of rotation of assembly 20. An elevating screw 66 is provided with a collar 68 which is welded or otherwise fixedly secured to the shank of screw 66. Collar 68 rests upon the upper side of plate 62. A horizontal abutment 70 is fixedly secured to the inner side of web 52 and formed with a vertically extending tapped bore 72 in which screw 66 is threadably received. A lock nut 74 is threaded upon screw 66 below plate 62 to lock the screw at a selected position of adjustment. The inner side edge 76 (FIGURE 4) of abutment 70 is spaced from the adjacent web 50 to provide clearance for the web 34 of the brush support member.

While only one brush has been indicated in FIGURE 1, in the usual case, several brushes will be employed symmetrically disposed about axis of chute 14. The operative relationship of the brushes to the chute and parts supported in the chute is indicated in the lower portion of FIGURE 2, the chute for convenience being illustrated as a conventional channel section with a part P indicated in broken line.

As indicated in FIGURE 2, the brush is adjusted radially of the chute axis, so that the bristles of the brush project into the chute to engage the part P. Upon rotation of the brush assembly about the chute axis, the bristles of the brushes urge the parts P along the helical chute.

The radial adjustment of the brush is accomplished by elevating screw assembly 60 in cooperation with the inclined vertical slots in the brush carrying member. To radially adjust the brushes, the various clamping bolts 38 are loosened to permit web 40 to slide along the side of web 34. Elevating screw 60 is then turned to shift the brush carrying member vertically relative to the stationary web 34 of the brush support member. In FIGURE 2, the brush is shown at its highest vertical position relative to support member 32 with the bristles of the brush at their innermost radial limit of movement. To move the brush out radially, elevating screw 60 is turned to lower the brush carrying member from the FIGURE 2 position. As the brush carrying member moves vertically downwardly relative to brush support member 32, as viewed in FIGURE 2, the inclination of slots 42 forces the brush to move radially outwardly as it is lowered. The brush carrying member is shifted vertically until the brush bristles are in the desired radial position, at which elevating screw 66 is clamped by tightening bolt 74, and the various damping bolts 38 are again tightened to lock the brush carrying member to brush support member 32. Because the slots are accurately aligned with each other, vertical movement in the foregoing manner causes the brush carrying member to shift outwardly as a unit while maintaining the brushes in a true vertical position. The number of slots employed may vary in accordance with the length of the brush.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. In a helical storage unit having a vertically disposed helical parts carrying chute, and rotary brush means rotatable about the axis of said chute in brushing engagement with parts carried in said chute for moving the parts along said chute; the improvement wherein said brush means comprises a vertically extending brush support member mounted for rotation about the axis of said chute, an elongate brush assembly having a length greater than the axial extent of said chute, an elongate web member fixed to said brush assembly and slidably engaging said brush support member, means for vertically adjusting said web member upon said brush support member, and means for positioning said web member radially of said axis in accordance with the adjusted vertical position of said web member relative to said brush support member to thereby adjust said brush assembly radially of the axis of said chute.

2. In a helical storage unit as defined in claim 1; the further improvement wherein said means for positioning said web member comprises means defining a plurality of parallel vertically inclined slots at vertically spaced locations on one of said members, the other of said members having a plurality of bores therethrough at corresponding vertically spaced locations, and clamping means mounted in each bore and projecting through a slot for guiding the web member in radial movement upon vertical movement of the web member relative to the support member and for clamping the members in adjusted relationship to each other.

3. In a helical storage unit as defined in claim 1; the further improvement wherein said means for vertically adjusting said web member comprises a horizontal abutment on one of said members and having a tapped bore therein, and an elevating screw mounted upon the other of said members and threadably received in said bore.

4. In a helical storage unit having a vertically disposed helical parts carrying chute, and rotary brush means rotatable about the axis of said chute in brushing engagement with parts carried in said chute for moving the parts along said chute; the improvement wherein said brush means comprises an elongate vertically extending brush support web mounted for rotation about the axis of said chute, an elongate brush assembly having a length greater than the axial length of said chute, an elongate web member fixed to said brush assembly and having a plurality of vertically spaced parallel inclined slots therethrough, a plurality of vertically spaced clamping bolts mounted upon said brush support web, each clamping bolt projecting from said brush support web through one of said slots in said elongate web member, said clamping bolts each having a nut thereon for clamping said web member against said brush support web, and means on said brush support web for vertically adjusting said web member relative to said support web, said slots constraining said web member to move radially of said chute axis upon vertical movement upon said web member relative to said support web.

5. In a helical storage unit as defined in claim 4; the further improvement wherein said means for vertically adjusting said web member comprises a horizontal plate fixed to said support web and having a slot therein extending radially from the chute axis, an elevating screw projecting through said slot and supported upon said plate, a horizontal abutment on said web member and means defining a tapped bore extending vertically through said abutment and threadably receiving said elevating screw.

References Cited by the Examiner

UNITED STATES PATENTS

| | | | |
|---|---|---|---|
| 599,904 | 3/1898 | Kempshall. | |
| 2,271,556 | 2/1942 | Boyle et al. | 15—183 |
| 3,071,240 | 1/1963 | Graham et al. | 198—212 |

EVON C. BLUNK, *Primary Examiner.*

ROBERT J. HICKEY, *Assistant Examiner.*